United States Patent
Keal et al.

(10) Patent No.: US 8,594,971 B2
(45) Date of Patent: Nov. 26, 2013

(54) DEDUCED RECKONING NAVIGATION WITHOUT A CONSTRAINT RELATIONSHIP BETWEEN ORIENTATION OF A SENSOR PLATFORM AND A DIRECTION OF TRAVEL OF AN OBJECT

(75) Inventors: William Kerry Keal, Santa Clara, CA (US); David Sachs, Sunnyvale, CA (US); Shang-Hung Lin, San Jose, CA (US); Erik Anderson, San Francisco, CA (US)

(73) Assignee: Invensense, Inc., San Jose, CA (US)

( * ) Notice: Subject to any disclaimer, the term of this patent is extended or adjusted under 35 U.S.C. 154(b) by 544 days.

(21) Appl. No.: 12/887,900

(22) Filed: Sep. 22, 2010

(65) Prior Publication Data

US 2012/0072166 A1 Mar. 22, 2012

(51) Int. Cl.
*G01C 17/00* (2006.01)
(52) U.S. Cl.
USPC .............. 702/150; 702/141; 702/142
(58) Field of Classification Search
USPC ........... 702/141, 142, 150; 700/302; 324/162, 324/163
See application file for complete search history.

(56) References Cited

U.S. PATENT DOCUMENTS

| | | | |
|---|---|---|---|
| 7,180,500 B2 | 2/2007 | Marvit et al. | |
| 7,333,087 B2 | 2/2008 | Soh et al. | |
| 7,508,384 B2 | 3/2009 | Zhang et al. | |
| 2005/0110778 A1 | 5/2005 | Ben Ayed | |
| 2006/0061545 A1 | 3/2006 | Hughes et al. | |
| 2006/0139327 A1 | 6/2006 | Dawson et al. | |
| 2006/0164382 A1 | 7/2006 | Kulas et al. | |
| 2007/0176898 A1 | 8/2007 | Suh | |
| 2008/0134784 A1 | 6/2008 | Jeng et al. | |
| 2008/0278445 A1* | 11/2008 | Sweetser et al. | 345/158 |
| 2009/0088204 A1 | 4/2009 | Culbert et al. | |
| 2011/0166821 A1* | 7/2011 | Kim | 702/141 |
| 2011/0306323 A1* | 12/2011 | Do et al. | 455/414.1 |
| 2012/0013736 A1* | 1/2012 | Graesser | 348/135 |

FOREIGN PATENT DOCUMENTS

EP 0429391 B1 8/1995

OTHER PUBLICATIONS

Cho, et al. Dynamics of Tilt-based Browsing on Mobile Devices. CHI 2007, Apr. 28-May 3, 2007, San Jose, California, USA. pp. 1947-1952.

\* cited by examiner

*Primary Examiner* — Sujoy Kundu
*Assistant Examiner* — Elias Desta
(74) *Attorney, Agent, or Firm* — Maryam Imam; IPxLAW Group PLLC (57) ABSTRACT

Systems, methods, and apparatus for performing deduced reckoning navigation without a constraint relationship between orientation of a sensor platform and a direction of travel of an object are described herein. A sensor fusion component can be configured to receive data from sensors of a sensor platform coupled to a pedestrian; and generate world coordinate information based on the data. Further, a gait recognition component can be configured to record one or more walking patterns of the pedestrian in a training database; and determine whether the world coordinate information is associated with a walking pattern of the one or more walking patterns. Furthermore, a position estimation component can be configured to estimate a position of the pedestrian based on the world coordinate information if the world coordinate information is associated with the walking pattern, regardless of an orientation of the sensor platform with respect to the position of the pedestrian.

25 Claims, 9 Drawing Sheets

DEDUCED RECKONING NAVIGATION WITHOUT A CONSTRAINT RELATIONSHIP BETWEEN ORIENTATION OF A SENSOR PLATFORM AND A DIRECTION OF TRAVEL OF AN OBJECT

TECHNICAL FIELD

This disclosure relates generally to deduced reckoning navigation including, but not limited to, deduced reckoning navigation without a constraint relationship between orientation of a sensor platform and a direction of travel of an object.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Various non-limiting embodiments of systems, methods, and apparatus presented herein determine a direction of travel of an object utilizing a sensor platform, regardless of an orientation of the sensor platform relative to the object.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component", "module", "block", "processing block", "system", and the like can, but need not, refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer-readable storage media, e.g., having various data structures stored thereon. Computer-readable storage media can be any available storage media that can be accessed by a computer and includes volatile and nonvolatile media, and removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media that can be used to store desired information. Computer-readable storage media can be accessed by one or more local or remote computing devices, e.g., via access requests, queries, or other data retrieval protocols, etc. for a variety of operations with respect to the information stored by the medium.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Figure 3:
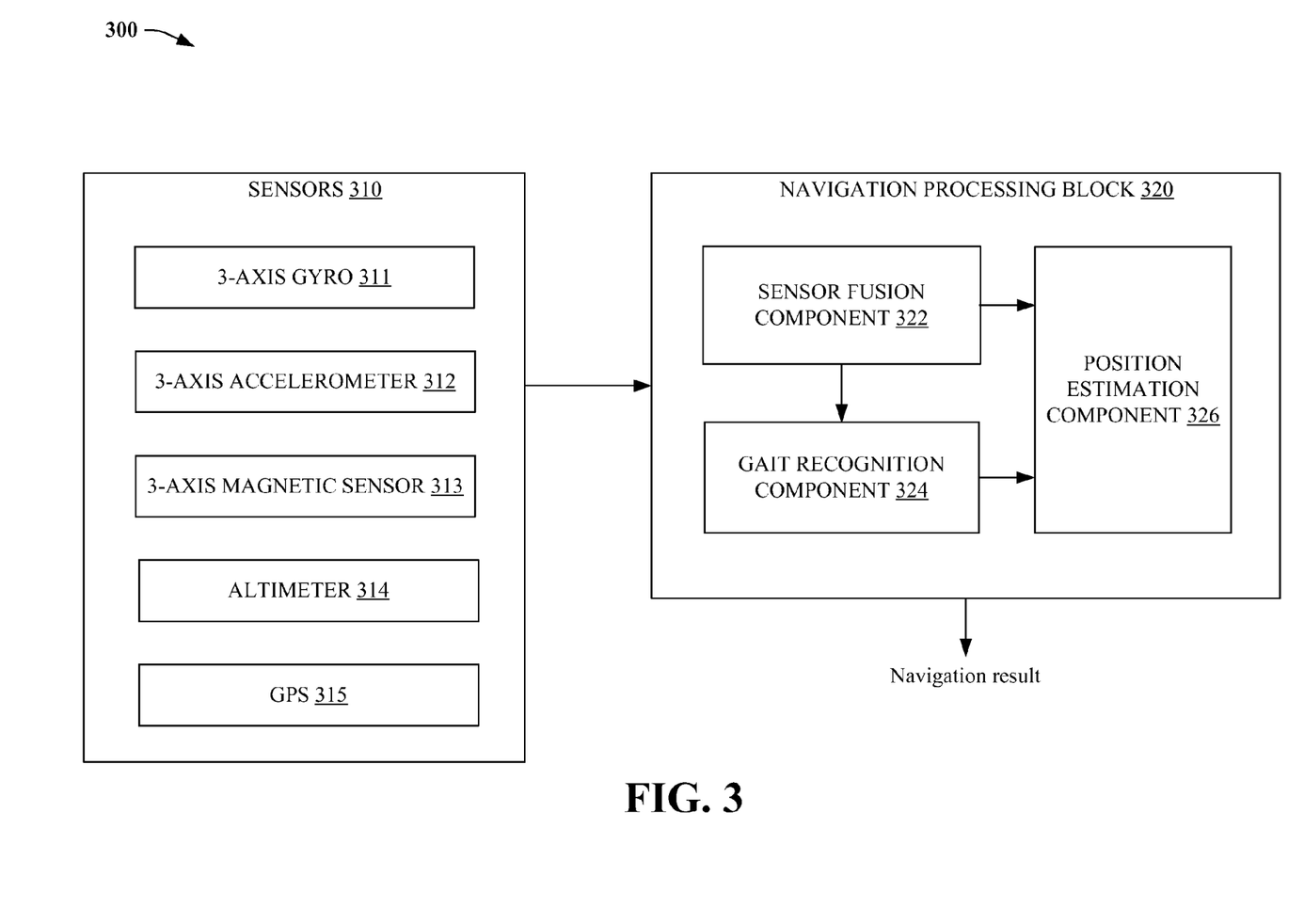
FIG. 3 illustrates a block diagram of another deduced reckoning navigation system, in accordance with an embodiment.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via gate recognition component 324 (described below) to automatically detect human gait patterns. In another example, the artificial intelligence system can be used, via gate recognition component 324, to automatically determine and/or learn a set of thresholds for detecting potential walking steps.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

The systems and processes described below can be embodied within hardware, such as a single mixed-signal integrated circuit (IC) chip, multiple ICs, an application specific integrated circuit (ASIC), or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated. Furthermore, aspects, features, and/or advantages of the disclosed subject matter can be exploited in substantially any wireless telecommunication or radio technology, e.g., wireless fidelity (Wi-Fi™), Bluetooth™, Worldwide Interoperability for Microwave Access (WiMAX™), etc.

The subject disclosure relates to systems, methods, and apparatus that can determine a direction of travel of an object utilizing a sensor platform without prior knowledge of an orientation of the sensor platform relative to the object. Conventional deduced reckoning navigation technologies require a fixed mounting orientation of a sensor platform, i.e., either firmly connected a user's sternum or the small of the user's back. Further, conventional pedometry navigation technologies require a fixed mounting location of sensor(s), and often require an associated mounting point to be on parts of the body with high periodic motion, e.g., a shoe.

Compared to such conventional deduced reckoning navigation technologies, various systems, methods, and apparatus described herein can perform deduced reckoning navigation in which a sensor platform can be in an a priori unknown location and orientation relative to a user. For example, and referring now to FIG. 1, a block diagram of a deduced reckoning navigation system 100 is illustrated, in accordance with an embodiment.

Figure 1:
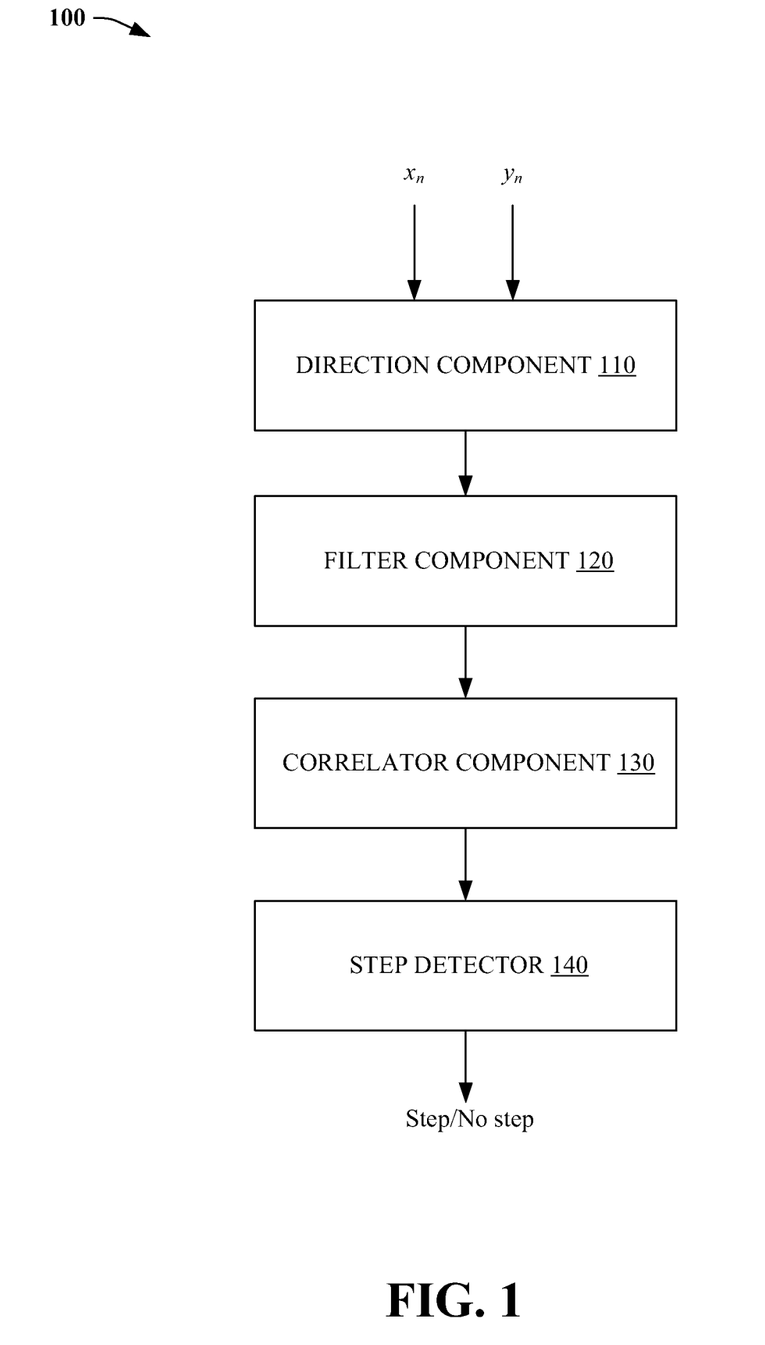
FIG. 1 illustrates a block diagram of a deduced reckoning navigation system, in accordance with an embodiment.

Deduced reckoning navigation system 100 can include a direction component 110 that can receive x-axis and y-axis acceleration information from sensors, e.g., gyroscopes ("gyros") and accelerometers integrated on a sensor platform coupled to a user. In an aspect, the sensors can be in a hand, pocket, belt, purse, or other location coupled to the user, e.g., a pedestrian. Direction component 110 can compute, based on the information, an orientation of the sensor platform with respect to gravity, e.g., thereby describing the orientation in a body coordinate frame. Further, direction component can utilize the orientation to convert accelerometer-based information into a reference frame, e.g., world frame, with z-axis up from the surface of the earth.

In another aspect, direction component 110 can enhance the world frame with information associated with a compass of the sensor platform, so that the world frame can be oriented towards magnetic north. In yet another aspect, direction component 110 can describe the orientation of the world frame with a quaternion, e.g., [q0, q1, q2, q3]. Further, direction component 110 can derive a frame, or p-frame, in which the pedestrian's velocity vector is in a relatively constant direction, so that when the pedestrian turns the sensor platform while walking, the velocity vector does not turn, e.g., fixing the p-frame to the user. In an aspect, direction component 110 can assume that the orientation of the sensors (or sensor platform), e.g., how the pedestrian is holding the sensor platform, is unknown, but slowly varying.

In one aspect, direction component 110 can utilize, e.g., Equations (1)-(14), etc. to convert the world frame with z-axis up to the p-frame. For example, direction component 110 can convert the world frame with z-axis up to the p-frame by projecting the x-body axis of the sensor platform onto the x-y coordinates of the world plane, which is the surface of the Earth, e.g., computing a rotation of the sensor platform about the z-axis of the world frame. In another example, direction component 110 can compute the p-frame by projecting the y-body axis of the sensor platform onto the x-y coordinates of the world plane. As described below, direction component 110 can compute the rotation of the sensor platform about the z-axis of the world frame by computing the sine and cosine of the rotation angle between the world frame and the p-frame.

To convert a quaternion into a rotation matrix for converting from a body frame (or body coordinate frame) to the world frame, direction component 110 can utilize Equation (1), defined as follows:

$$\begin{bmatrix} q0^2 + q1^2 - q2^2 - q3^2 & 2*q1*q2 - 2*q0*q3 & 2*q1*q3 + 2*q0*q2 \\ 2*q1*q2 + 2*q0*q3 & q0^2 - q1^2 + q2^2 - q3^2 & 2*q2*q3 - 2*q0*q1 \\ 2*q1*q3 - 2*q0*q2 & 2*q2*q4 + 2*q0*q1 & q0^2 - q1^2 - q2^2 + q3^2 \end{bmatrix}. \quad (1)$$

Utilizing the first two elements in the first column of Equation (1), direction component 110 can project the x-body axis down onto the world frame—the first column representing the x-body axis in the world frame. Further, direction component 110 can determine the sine and cosine of the rotation angle between the world frame and the p-frame utilizing Equations (2) and (3), defined as follows (factoring out the scale factor of 2, and noting the sum of the squares of the quaternion is 1):

$$t_1 = (q1*q2 + q3*q0)$$
$$t_2 = (q0*q0 + q1*q1 - .5) \quad (2)$$

$$\cos(\beta) = \frac{t_2}{\sqrt{t_1^2 + t_2^2}} \quad (3)$$

$$\sin(\beta) = \frac{-t_2}{\sqrt{t_1^2 + t_2^2}}.$$

Equation (4), defined as follows, converts x and y accelerations ($a_x$ and $a_y$, respectively) in the world frame to a p-frame:

$$x_n = a_x \cos(\beta) + a_y \sin(\beta)$$
$$y_n = a_x \sin(\beta) + a_y \cos(\beta) \quad (4)$$

Direction component 110 can compute the rotation of the sensor platform about the z-axis of the world frame by solving for the rotation angle between the world frame and the p-frame, effectively solving for how the sensor platform is oriented with respect to a direction of travel, e.g., walking direction, of the pedestrian.

Further, utilizing Equation (5), defined as follows:

$$\text{Maximize over } \alpha: \Sigma(x_n*\cos(\alpha) + y_n*\sin(\alpha))^2, \quad (5)$$

direction component 110 can break up the direction of travel, or heading, into 2 angles, effectively removing the effect of the user (or pedestrian) making a turn on computation of orientation of the sensor platform with respect to the user (or direction of travel of the user/pedestrian). Angle $\alpha$ is a measure from positive x towards positive y. Equation (5) can be rearranged into Equation (6), defined as follows:

$$\cos^2(\alpha) \Sigma x_n^2 + \sin(2\alpha) \Sigma x_n*y_n + \sin^2(\alpha) \Sigma y_n^2. \text{ tm (6)}$$

Let:

$$a_0 = \Sigma x_n^2 \quad a_1 = \Sigma x_n*y_n \quad a_2 = \Sigma y_n^2. \quad (7)$$

Taking the derivative of Equation (7) results in Equation (8):

$$(a_2 - a_0)\sin(2\alpha) + 2a_1 \cos(2\alpha) = 0 \quad (8)$$

$$\tan(2\alpha) = \frac{2a_1}{(a_0 - a_2)y_n} = a_x \sin(\beta) + a_y \cos(\beta).$$

Equation (8) has 4 solutions—2 minimums and 2 maximums. The maximums are needed to find the direction of walking, but a 180 degree ambiguity exists. For signal responses when the sensor platform is in the pocket of the user, the 180 degree ambiguity can be solved, as the shape is not symmetric about zero, or by finding average positive acceleration described below. The 180 degree ambiguity is less pronounced when the sensor platform is in a hand of the user.

Equation (8) indicates the best estimate of direction of travel of the user; however, Equation (8) requires performing an a tan( ) operation. As described below, since only the sine and cosine of the rotation angle between the world frame and the p-frame are required, Equation (8) can easily be converted to give the cosine and sine of twice the angle, defined by Equations (9) and (10) as follows:

$$\cos(2\alpha) = \frac{(a_0 - a_2)}{\sqrt{(a_0 - a_2)^2 + 4a_1^2}} \quad (9)$$

$$\sin(2\alpha) = \frac{2a_1}{\sqrt{(a_0 - a_2)^2 + 4a_1^2}}. \quad (10)$$

Further, half angle formulas defined by Equations (11) and (12), as follows, can be used to calculate the sine and cosine of the rotation angle between the world frame and the p-frame:

$$\sin(\alpha) = \pm \sqrt{\frac{1}{2}\left(1 - \frac{(a_0 - a_2)}{\sqrt{(a_0 - a_2)^2 + 4a_1^2}}\right)} \quad (11)$$

$$\cos(\alpha) = \pm \sqrt{\frac{1}{2}\left(1 + \frac{(a_0 - a_2)}{\sqrt{(a_0 - a_2)^2 + 4a_1^2}}\right)}. \quad (12)$$

The absolute value was dropped in Equations (11) and (12) since a positive result is required. Further, if $a_1$ is positive, then $\sin(\alpha)$ and $\cosine(\alpha)$ have the same sign; if $a_1$ is negative, then $\sin(\alpha)$ and $\cosine(\alpha)$ have opposite signs. Thus, Equations (13) and (14), as follows, reflect selecting a positive value of Equation (11) and selecting a negative value of Equation (12) if $a_1$ is negative, respectively.

$$\sin(\alpha) = \sqrt{\frac{1}{2}\left(1 - \frac{(a_0 - a_2)}{\sqrt{(a_0 - a_2)^2 + 4a_1^2}}\right)} \quad (13)$$

$$\cos(\alpha) - \text{sign}(a_1)\sqrt{\frac{1}{2}\left(1 + \frac{(a_0 - a_2)}{\sqrt{(a_0 - a_2)^2 + 4a_1^2}}\right)}. \quad (14)$$

The 180 degree ambiguity of Equations (13) and (14) can be evaluated utilizing Equation (15), as follows:

$$a_3 = \Sigma x_n, a_4 = \Sigma y_n, \quad (15)$$

and assuming the user is accelerating in the direction of travel, if $(\cos(\alpha)*a_a + \sin(\alpha)*a_4) < 0$, then $\cos(\alpha) = -\cos(\alpha)$ and $\sin(\alpha) = -\sin(\alpha)$. Accordingly, Equation (16) results, in which direction component 110 applies the computed sine and cosine of the rotation angle between the world frame and the p-frame to the x and y acceleration of the user, as follows:

$$g_n = x_n \cos(\alpha) + y_n \sin(\alpha); \quad (16)$$

and referring now to FIG. 1, direction component 110 generates step detection $g_n$ as an output coupled to filter component 120.

In an aspect, filter component 120 can filter $g_n$ with a bandpass filter to remove spurious signals and user jittering. In another aspect, filter component 120 can utilize a second ($2^{nd}$) order butterworth filter with cutoff frequencies of 1.1 Hz to 4.5 Hz, and with a 200 Hz sample rate, described by Equation (17) as follows:

$$f_n = 0.0507451797518774*(g_n - g_{n-2}) + \quad (17)$$
$$1.89386957517811*f_{n-1} - 0.898509640496245*f_{n-2}.$$

Further, correlator component 130 can receive the filtered $g_n$ signal from filter component 120 and correlate the filtered $g_n$ signal with a signal that represents the user taking a step with the sensor platform in a particular location. In an aspect, several signals representing the sensor platform in various locations and with various users with various walking speeds can be used to correlate the filtered $g_n$ signal with the signal that represents the user taking a step.

Let:

$$w_{n,u} = \text{expected signal } u, \text{with sample } n, \qquad (18)$$

then filter component 120 can derive a correlation $c_u$ (see Equation (19)) for an expected signal u, with sample n, as follows:

$$c_u = \Sigma f_n * w_{n,u}. \qquad (19)$$

Referring again to FIG. 1, step detector 140 can receive $c_u$ and declare (at an output) a step if $c_u$ is within an expected threshold. Further, step detector 140 can declare the step if the minimum and maximum value of $f_n$ over the correlation window is within a particular range.

In an aspect, step detector 140 can reduce the false detection rate by utilizing one or more methods (together, or a subset of a combination of such methods) to categorize signals that would have triggered a step detection into (1) legitimate step detections and (2) likely false step detections. For example, in one aspect, step detector 140 can utilize an impulse detector (not shown), capable of measuring peak acceleration within a time window, to declare "not a step" (or "no step"). In an aspect, if the magnitude of acceleration in the x and/or y direction exceeds a threshold, e.g., 0.5 g, then step detector 140 can declare not a step. In another aspect, if the magnitude of acceleration in the z direction (with gravity removed) exceeds a threshold of 0.6 g, then step detector 140 can declare not a step. In yet another example, if the magnitude of the change in acceleration over a short period of time (for example 35 ms) exceeds a threshold for the x and/or y accelerations, e.g., of 0.5 g, then step detector 140 can declare not a step.

In one aspect, if the magnitude of the change in acceleration over a short period of time (for example 35 ms) exceeds a threshold for the z acceleration, e.g., 0.5 g, then step detector 140 can declare not a step. In another aspect, if the orientation of the sensor platform with respect to a direction of travel of the user changes by more than a threshold (for example 20 degrees) over a short period of time (for example 66 ms), then step detector 140 can declare not a step.

In another example, correlator component 130 can use larger threshold(s), e.g., 30 degrees, when correlating the filtered $g_n$ signal with a signal that represents the user taking a step with the sensor platform in a particular location, e.g., if the sensor platform is determined to be located in a pocket or purse of the user. It should be appreciated that the "not a step" methods described above can be used before or after the correlation performed by correlator component 130. As such, step detector 140 can receive the filtered $g_n$ signal from filter component 120 to perform such "not a step" methods.

In yet another example, correlator component 130 can cease correlation for a period of time, such as 400 ms. In one example, step detector 140 can utilize threshold values for vertical motion, horizontal motion, and/or angular motion to reject false step detections. In another example, step detector 140 can detect false steps by summing positive values of $f_n$, e.g., a time series of linear acceleration and angular velocity functions, and the negative values of $f_n$, and declare not a step if such sums exceed a value. For example, step detector 140 can sum positive and negative values of $f_n$ over the number of samples used in the correlation performed by correlator component 130.

Figure 2:
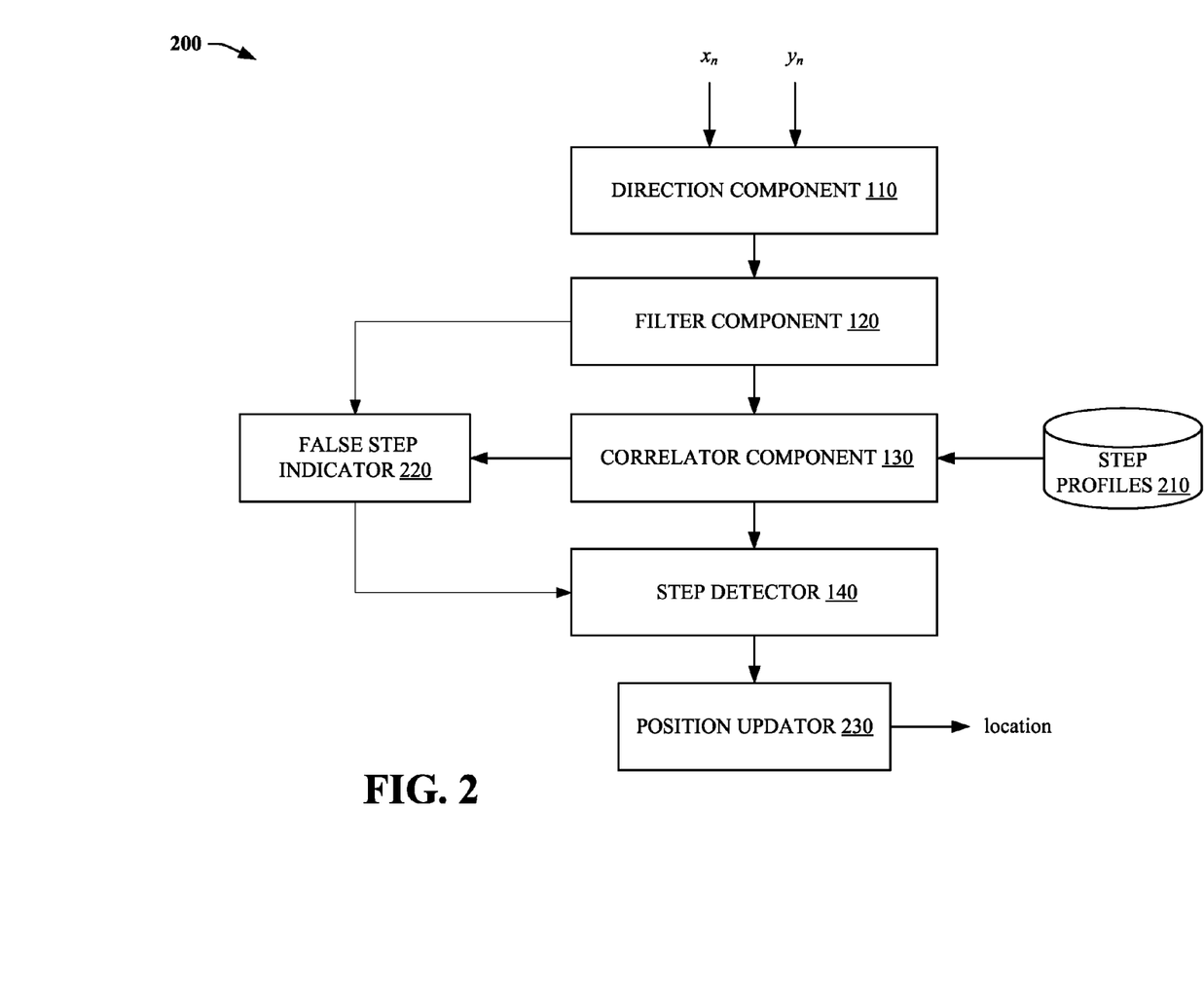
FIG. 2 illustrates a block diagram of a deduced reckoning navigation system utilizing stored step profiles, in accordance with an embodiment.

FIG. 2 illustrates a block diagram of a deduced reckoning navigation system 200 utilizing stored step profiles, in accordance with an embodiment. In addition to utilizing components and features described above with regard to deduced reckoning navigation system 100, deduced reckoning navigation system 200 includes step profiles 210, false step indicator 220, and position updator 230. Step profiles 210 includes a database and interfaces with correlator component 130, storing information, for example, representative of the user taking a step with the sensor platform in a particular location. In another example, step profiles 210 stores information representing the sensor platform in various locations, with various users, and with various walking speeds. Correlator component 130 can receive one or more signals from step profiles 210, and correlate a filtered $g_n$ signal with the one or more signals.

Further, false step indicator 220 can implement the one or more methods described above in relation to step detector 140 to detect a false step, or no step. Furthermore, position updator 230 can estimate a direction of travel and/or location of the user based on the correlated p-frame coordinate information output by correlator component 130, e.g., updating the location, or position, of the user if a false step was not detected by false step indicator 220.

In one embodiment, correlator component 130 can correlate the filtered $g_n$ signal with time delayed sensor data received by direction component 110. The time delay of the sensor data can range from 0.5 to 1.5 of the previous step time. In another embodiment, correlator component 130 can initially use previously captured time delayed sensor data, or utilize the time delayed sensor data after a period of no step detection, e.g., 10 seconds. Further, correlator component 130 can save such time delayed sensor data at a vector X. For subsequent steps, if correlator component 130 detects a match of a current vector Y to vector X, then correlator component 130 can utilize vector Y to update vector X as follows:

$$X := 0.5*Y + 0.5*X, \qquad (20)$$

in which := is an assignment operator, as opposed to an equal operator. In another aspect, correlator component 130 can double the time to correlate data to account for asymmetrical motion of sensors located, e.g., inside a pocket.

In one aspect, direction component 110 of deduced reckoning navigation system 200 can alternatively define a p-frame as a shortest angle to rotate the z-body axis to an axis with z-axis up from the surface of the Earth. As such, direction component 110 can define the z-body axis in world coordinates as the last column in the rotation matrix derived from the body to world quaternion, as follows:

$$Z_{body} = \begin{pmatrix} r_2 \\ r_5 \\ r_8 \end{pmatrix} = \begin{pmatrix} 2q_1 q_3 + 2q_0 q_2 \\ 2q_2 q_3 + 2q_0 q_1 \\ 2q_0 q_0 + 2q_3 q_3 - 1 \end{pmatrix}. \qquad (21)$$

A quaternion represents a rotation about a vector in 3-space. Accordingly, direction component 110 can rotate about a vector defined by $Z_{body}$ cross product $Z_{up} = (0,0,1)$—the angle between these vectors equivalent to the angle of rotation. Taking the dot product of the two vectors can give the cosine of the angle, which is r8. Direction component 110 can derive sine and cosine of half the angle by using the half angle formula to convert the cosine of the angle into the sine and cosine of half the angle. Further, direction component 110 can derive the quaternion given by Equation (22) as follows:

$$Q_{body\_to\_p} = \begin{pmatrix} \sqrt{\dfrac{1+r_8}{2}} \\ \dfrac{-\text{sign}(r_8)r_5}{\sqrt{r_5^2+r_2^2}}\sqrt{\dfrac{1-r_8}{2}} \\ \dfrac{\text{sign}(r_8)r_2}{\sqrt{r_5^2+r_2^2}}\sqrt{\dfrac{1-r_8}{2}} \\ 0 \end{pmatrix} \quad (22)$$

In another aspect, e.g., low memory applications, to conserve processing resources, etc. direction component 110 can compute $x^2-y^2$ since it is linear, instead of computing both $a_0$ and $a_2$ (from Equation (7)), and can scale terms by any amount as long as the same scaling is performed on all terms, e.g., since direction component 110 computes the ratio of $a_0$, $a_2$ to $a_1$. As such, direction component 110 can utilize Equations (23)-(26) as follows to generate step detection output $g_n$, e.g., in a low memory environment:

$$a_0 - a_2 = \text{LowPassFilter}(x_n^2 - y_n^2) \quad (23)$$

$$a_1 = \text{LowPassFilter}(x_n * y_n) \quad (24)$$

$$a_3 = \text{LowPassFilter}(x_n) \quad (25)$$

$$a_4 = \text{LowPassFilter}(y_n) \quad (26)$$

Referring now to FIG. 3, a block diagram of another deduced reckoning navigation system (300) is illustrated, in accordance with an embodiment. Deduced reckoning navigation system 300 utilizes multiple sensors included in sensors 310, e.g., sensor platform. In one embodiment, sensors 310 includes inertial sensing devices (gyros, accelerometers), magnetic sensors, an altimeter, and a GPS. As illustrated, sensors 310 includes 3-axis gyro 311, 3-axis accelerometer 312, 3-axis magnetic sensor 313, altimeter 314, and GPS 315. In another aspect, GPS 315 is not integrated into sensors 310. Sensors 310 interfaces with navigation processing block 320 via one or more signals.

Navigation processing block 320 includes sensor fusion component 322, gait recognition component 324, and position estimation component 326. Sensor fusion component 322 can combine different sensor signals and can generate a robust estimate of orientation, linear acceleration, and angular velocity of the sensor platform in the world coordinate system. Further, sensor fusion component 322 can reduce the influence from sensor bias, noise, and sensitivity change(s).

Gait recognition component 324 can receive conditioned, world coordinate signals from sensor fusion component 322. When gait recognition component 324 detects a repeating moving sequence that resembles a walking pattern in a training database, it triggers position estimation component 326 to estimate the stride length and the pedestrian heading, which may or may not be the same as the device (or sensor platform) heading. Navigation processing block 320 can be realized as an ASIC or a software library that runs on a host CPU.

In another embodiment (not shown), navigation processing block 320 can integrate multiple sensors, e.g., sensors 310, into a single IC. In one aspect (not shown), gait recognition component 324 and position estimation component 326 can directly receive information from GPS 315, regardless of whether GPS 315 is included in sensors 310, or in the single IC. In an aspect, navigation processing block 320 can be placed inside an earphone, an earring, a pen, or eye glasses. A navigation result, or position estimate, generated by navigation processing block 320 can be transmitted to a handset via wireless link such as Bluetooth or WiFi. In an aspect, the handset is a display device.

An example of sensor fusion implementation performed by sensor fusion component 322 includes 3-axis gyro 311 and 3-axis accelerometer 312 signals combined to generate the device (or sensor platform) orientation in quaternion form. Another example of sensor fusion implementation uses data from 3-axis gyro 311, 3-axis accelerometer 312, and 3-axis magnetic sensor 313. In addition to device orientation, the heading estimation error due to gyro bias and sensitivity variation is compensated by 3-axis magnetic sensor 313. Gait recognition component 324 detects human gait patterns based on sensor fusion data generated by sensor fusion component 322.

In walking, progression (or movement) is presented by alternating periods of loading and unloading. This alternation generates periodical peaks (maximum acceleration and angular rate) and valleys (maximum acceleration and angular rate in the opposite direction) in the waveform of the world coordinate linear acceleration signal, e.g., associated with a pedestrian coupled to deduced reckoning navigation system 300. The alternation also creates directional pulses on the x-y plane of linear acceleration. In addition to the acceleration toward the walking direction, a small acceleration vector pointing to the left can appear when the left foot of the pedestrian steps forward, and similarly a small right acceleration can appear when the right foot of the pedestrian steps forward. A true heading can be estimated by position estimation component 326 from the average of the alternating step acceleration directions.

In an embodiment, gait recognition component 324 can perform gait recognition by detecting the maximum, the minimum, and/or the variance of the acceleration and angular rate waveforms generated by sensor fusion component 322. In other embodiment, gait recognition component 324 can determine the start and end points of a walking step of the pedestrian based on a zero-crossing point of an acceleration waveform. In yet another embodiment, gait recognition component 324 can use step duration and the magnitude and direction of the xy-plane acceleration vector to perform gait recognition. In other embodiments, gait recognition component 324 can utilize wavelet analysis, fast Fourier transform (FFT), hidden Markov model(s), and auto-correlation to affect feature extraction for gait recognition, e.g., utilizing artificial intelligence features described above.

In an aspect, gait recognition component 324 can receive a feature vector from sensor fusion component 322. Further, gait recognition component 324 can determine if the feature vector represents a potential walking step. In one embodiment, gait recognition component 324 can compare the feature vector with a pre-defined or pre-trained set of thresholds. In another embodiment, the gait recognition component 324 can learn the set of thresholds in operation mode. One example of a learning method performed by gait recognition component 324 is an unsupervised clustering technique such as vector quantization. To learn a new walking pattern, gait recognition component 324 can record a data sequence for a period of time, check if a similar motion pattern is repeating, and verify if such motion pattern creates a linear acceleration toward a similar heading, e.g., moving forward.

In another aspect, GPS information obtained by GPS 315 can be recorded during the period of time, and checked to confirm pedestrian movement. Further, gait recognition component 324 can store learned step data in a motion database, so that similar pattern(s) can be recognized in the future. A library of gaits for each user (slow walk, brisk walk, running) can in this way be built up when GPS information is available. The library of gaits can accommodate gait patterns for multiple device mounting locations, including handheld, belt-mount, in pocket, or in purse.

In one aspect, gait tracking by gait recognition component 324 can only be enabled when a handheld device is at a certain tilt angle that indicates the user is looking at a screen, etc. of the handheld device. In another aspect, sensor fusion component 322 can provide tilt angle information to gait recognition component 324 via sensors 310.

In an embodiment, the detection of a gait pattern via gait recognition component 324 can trigger position estimation component 326 operation(s). For example, position estimation component 326 can receive conditioned sensor data from sensor fusion component 322, gait information from gait recognition component 324, and GPS information from GPS 315 based on a trigger received from gait recognition component 324. In an aspect, position estimation component 326 can estimate a heading of the pedestrian, a direction of travel of the pedestrian, a navigation result associated with the pedestrian, a travel distance associated with the pedestrian, etc. based on information received from sensor fusion component 322 and gait recognition component 324.

For example, to avoid erroneous heading and distance accumulation, position estimation component 324 can integrate only information/signals received from sensor fusion component 322 during the time period that the gait recognition block identifies as "walking status." In an aspect, position estimation component 324 can utilize a Kalman filter to estimate the heading, etc. of the pedestrian. In another aspect, position estimation component 324 can utilize a particle filter to estimate the heading, etc. of the pedestrian.

Figure 4:
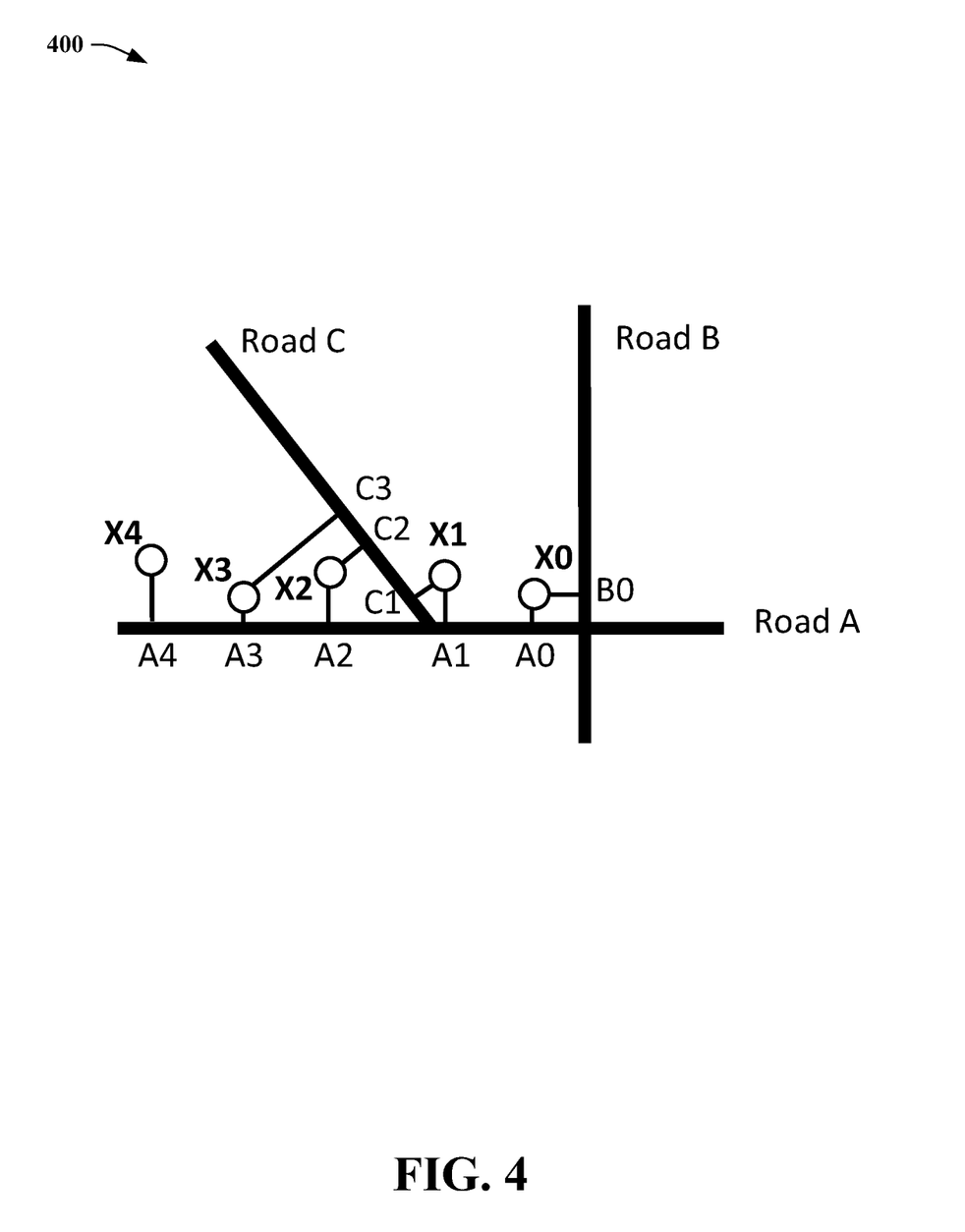
FIG. 4 illustrates map information utilized by a deduced reckoning navigation system, in accordance with an embodiment.

Now referring to FIG. 4, map information utilized by a deduced reckoning navigation system (e.g., 200, 300) is illustrated, in accordance with an embodiment. If map information is available, position estimation component 326 can be configured to perform map matching by Bayesian inference. As illustrated by FIG. 4, {X0, X1, ..., X4} is a sequence of position estimation information received by position estimation component 326, e.g., from gait recognition component 324. To determine whether the pedestrian takes road A or road C, position estimation component 326 can calculate the posterior probabilities of $p(A\_k|X\_0{:}k)$ and $p(C\_k|X\_0{:}k)$ recursively as follows:

$$P(A\_k|X\_0{:}k) = \{p(X\_k|A\_k) * p(A\_k|X\_0{:}k-1)\} / p(X\_k|X\_0{:}k-1), \quad (27)$$

in which $p(X\_k|A\_k)$ is the likelihood function, $p(A\_k|X\_0{:}k-1)$ is the prior probability, and $p(X\_k|X\_0{:}k-1)$ is the normalization factor. The likelihood function can be assigned, via position estimation component 326, to be inversely proportional to the shortest distance (shown as thin lines in FIG. 4) to a road. Further, $p(C\_k|X\_0{:}k)$ can be estimated similarly. If at step k, the posterior probability $p(A\_k X\_0{:}k)$ is larger than $p(C\_k|X\_0{:}k)$, position estimation component 326 can determine the pedestrian is taking road A.

Figure 5:
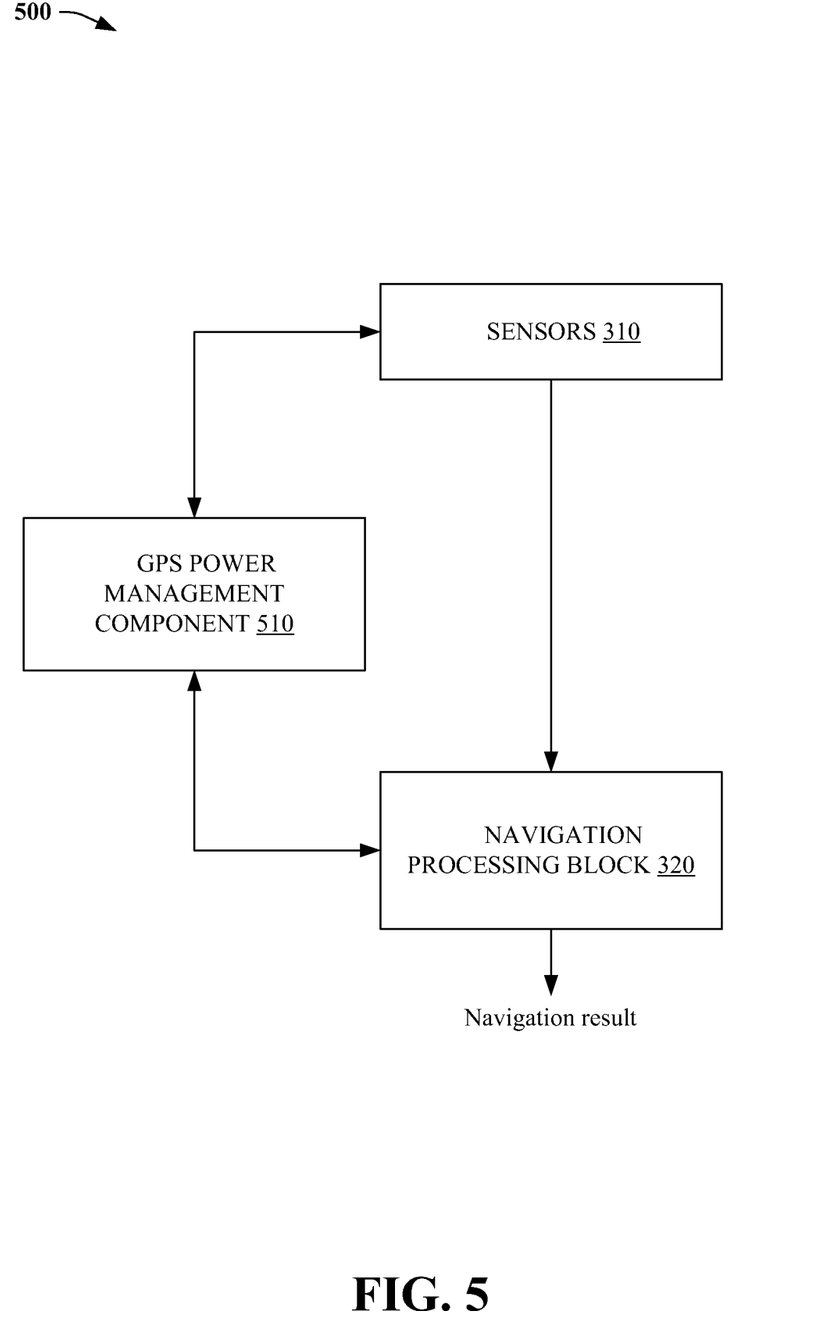
FIG. 5 illustrates a deduced reckoning navigation system utilizing a global positioning system (GPS) power management component, in accordance with an embodiment.

In another embodiment, deduced reckoning navigation systems of the subject disclosure can use a particle filter to perform map matching. For example, sample points, i.e., particles, are distributed along roads on a map the pedestrian is near. As the pedestrian moves a few steps, the number of valid sample points can reduce, and the valid sample points can converge to a most probable position. A confidence score produced by gait recognition component 324 can be used by position estimation component 326 to determine an importance function for re-sampling conditioned sensor data received from sensor fusion component 322. In an aspect, lower gait recognition confidence will incur wider sampling distribution. In another aspect related to GPS power management component 510 (see below), the confidence score produced by gait recognition component 324 can be used for power management functions, e.g., to regulate GPS duty cycle.

FIG. 5 illustrates a deduced reckoning navigation system 500 utilizing a GPS power management component 510, in accordance with an embodiment. GPS power management component 510 can be configured to regulate a duty cycle of a GPS sensor, e.g., GPS 315, based on a "stationary state", a "learning state", and a "tracking state". The stationary state can represent that a person's position is unchanged. Accordingly, GPS power management component 510 can set the GPS duty cycle to a lowest power setting. The learning state can indicate a period during which a new gait pattern is detected and navigation processing block 320 is learning the new gait pattern, e.g., via gait recognition component 324. As such, GPS power management component 510 can increase the GPS duty cycle, so that the GPS can provide a more accurate position reading.

The tracking state can indicate the person is moving and the system is tracking the position, e.g., via gait recognition component 324. During the tracking state, GPS power management component 510 can determine a duty cycle of the GPS by a confidence score (see above) produced by gait recognition component 324 and/or position estimation component 326. If in some areas the GPS signal is lost, but the gait tracking confidence level is high, navigation processing block can perform deduced reckoning without setting GPS 315 into a high power searching mode.

Figure 6:
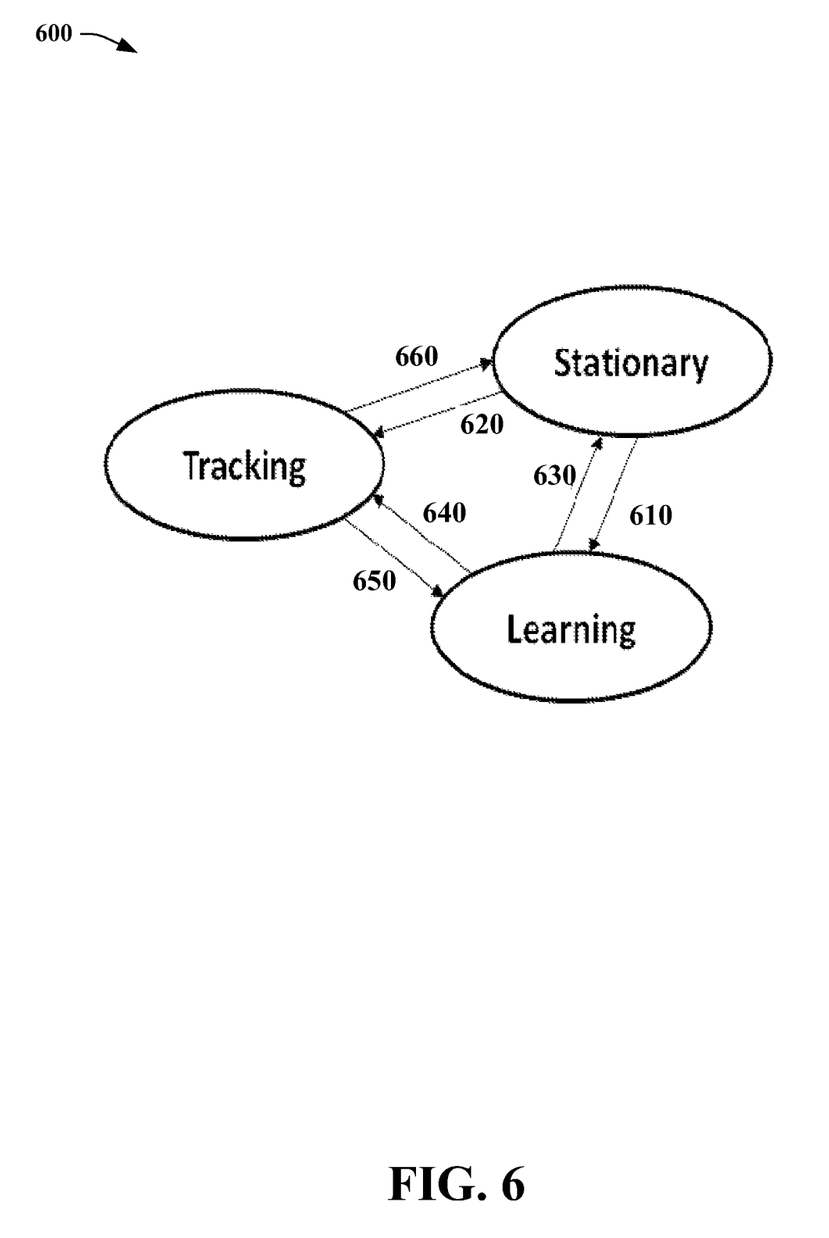
FIG. 6 illustrates a state machine associated with the GPS power management component, in accordance with an embodiment.

Now referring to FIG. 6, a state machine associated with GPS power management component 510 is illustrated, in accordance with an embodiment. At 610, GPS power management component 510 can transition from a "Stationary" state to a "Learning" state if navigation processing block 320 detects a repetitive "step-like" motion sequence, and if the detected motion sequence does not match any pattern in the previously learned "motion database", e.g., associated with gait recognition component 324. Further, GPS power management component 510 can increase the GPS power duty cycle in order to receive an accurate position reading during the Learning state. At 620, GPS power management component 510 can transition from the Stationary state to a "Tracking state" if the detected "step-like" motion sequence matches one or more patterns in the motion database. As such, the GPS power duty cycle can either remain the same or slightly increase, via GPS power management component 510.

GPS power management component 510, at 630, can transition from the Learning state to the Stationary state if the motion stops. Further, GPS power management component 510 can return the GPS power duty cycle to a low GPS power duty cycle. At 640, GPS power management component 510 can transition from the Learning state to the Tracking state when the new moving pattern is learned (e.g. after 5 seconds). Further, GPS power management component 510 can lower the GPS power duty cycle. GPS power management component 510, at 650, can transition from the Tracking state to the Learning state when gait recognition component 324 detects a new moving pattern, for example, from a pattern of walking to a pattern of running. Further, GPS power management component 510 can increase the GPS power duty cycle for system learning via gait recognition component 324.

At 660, GPS power management component 510 can transition from the Tracking state to the Stationary state when motion stops; and GPS power management component 510 can lower the GPS power duty cycle. The disclosed power management scheme is applicable to other augmented positioning systems such as Assisted GPS, Differential GPS, or GSM localization.

Figure 7:
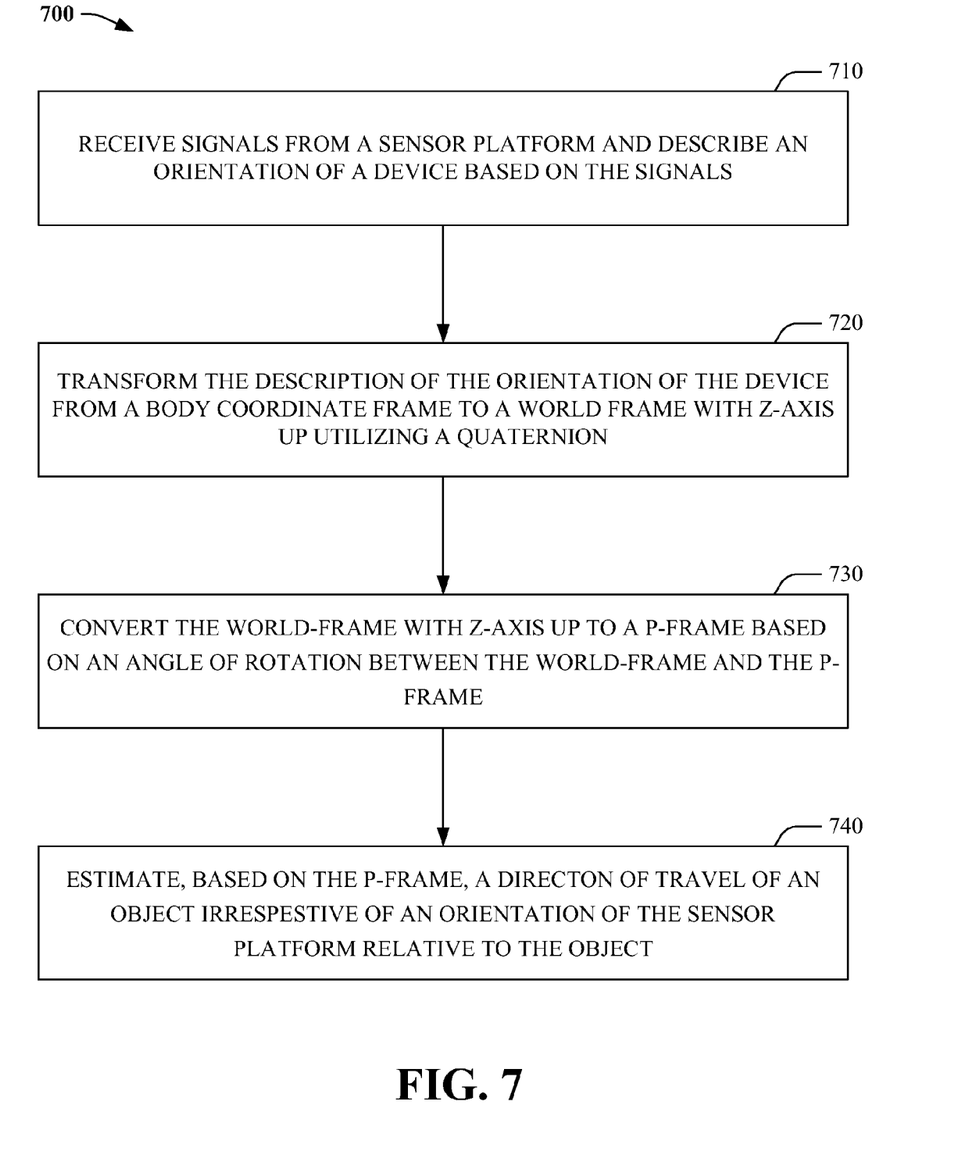
FIG. 7 illustrates a process for performing deduced reckoning navigation, in accordance with an embodiment.
Figure 8:
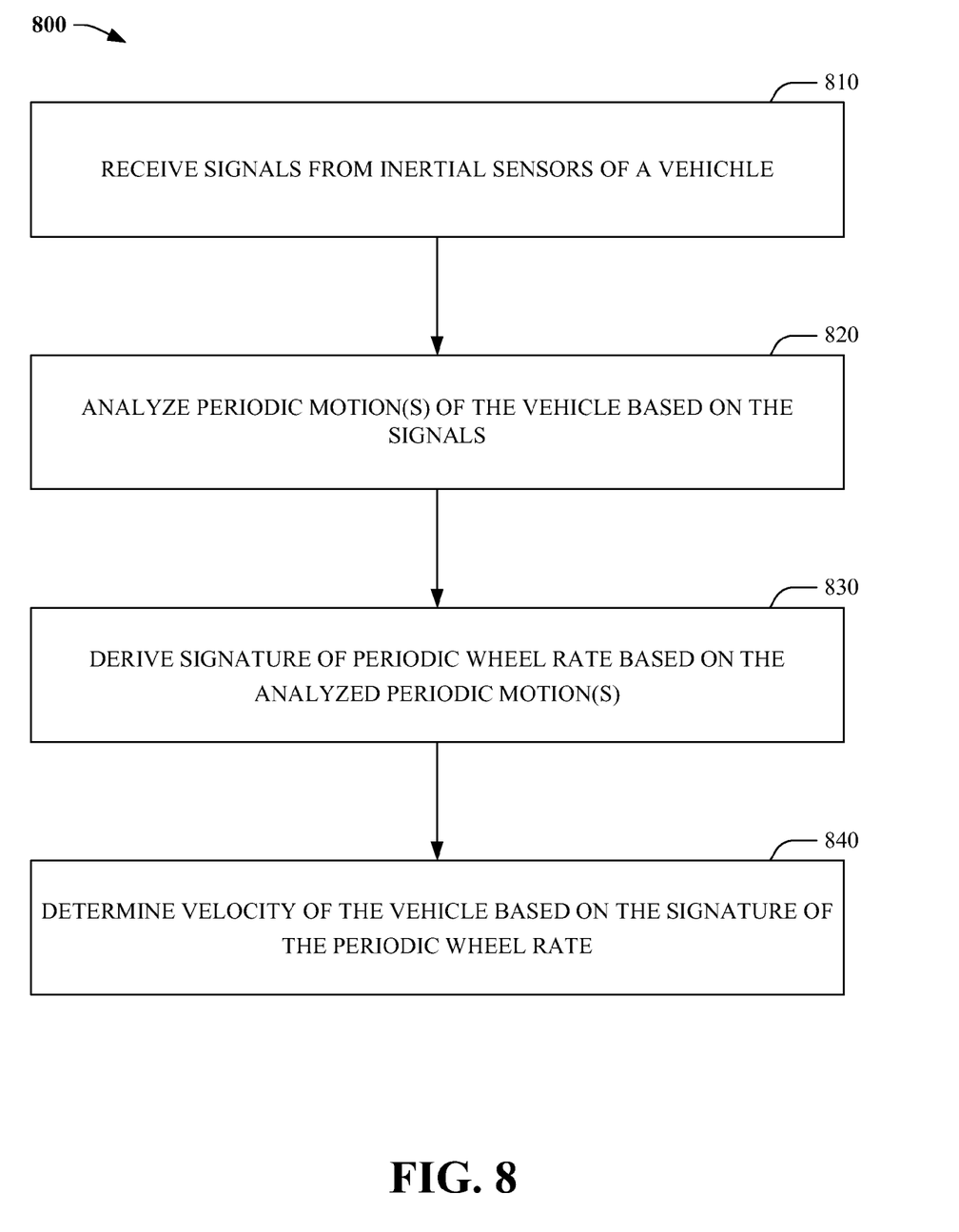
FIG. 8 illustrates a process for performing deduced reckoning navigation associated with wheel-based motion, in accordance with an embodiment.

FIGS. 7-8 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on firmware and/or software, and/or are capable of being executed via analog and/or digital components including ICs, discrete circuit devices and components, ASICs, FPGAs, microcontrollers, central processing units, etc.

Referring now to FIG. 7, a process 700 for performing deduced reckoning navigation (e.g., via deduced reckoning systems 200, 300, 500, etc.) is illustrated, in accordance with an embodiment. In one embodiment, aspects of process 700 can be performed via sensors 310 and navigation processing block 320. At 710, signals from a sensor platform, e.g., sensors 310, coupled to an object can be received, e.g., via navigation processing block 320, which can further describe an orientation of a device, e.g., including the sensor platform, based on the signals. At 720, the description of the orientation of the device can be transformed from a body coordinate frame to a world frame with z-axis up from the surface of the earth utilizing a quaternion. The world frame can be converted, at 730, to a p-frame based on an angle of rotation between the world frame and the p-frame. For example, process 700 can derive a sine and a cosine of the angle of rotation between the world frame and the p-frame using a quaternion. Further, process 700 can determine the p-frame based on the sine and the cosine as a function of accelerations in the world frame. At 740, a direction of travel of the object, e.g., person, animal, wheeled vehicle, etc. can be estimated, based on the p-frame, irrespective of an orientation of the sensor platform relative to the object.

FIG. 8 illustrates a process 800 for performing deduced reckoning navigation (e.g., via deduced reckoning systems 200, 300, 500, etc.) associated with wheel-based motion, in accordance with an embodiment. Conventional wheeled vehicle navigation technologies, in the absence of GPS signal(s), rely on gyroscope and compass instruments for obtaining heading and/or direction of travel information; however, such technologies do not use inertial sensors to directly measure speed of travel. Speed information is typically provided directly by wheel-tick/odometer output. This information is typically available when an associated navigation system is installed with the vehicle, but not when navigation is performed via a sensor platform, e.g., included in a mobile device such as a mobile phone, which is not directly integrated with automobile sensors. The process 800 depicted in FIG. 8 provides a method of determining speed of travel without access to sensors integrated with the vehicle and without access to GPS.

Compared to conventional technologies, process 800 extends pedometry-like information, e.g., in which a number of detected steps is directly proportional to distance traveled, to an automotive environment—by detecting a periodic motion proportional to distance for wheeled vehicles. For example, inertial sensors can analyze two classes of periodic motions in wheeled vehicles: 1.) motions corresponding to mechanical modes of the wheeled vehicle (fixed frequency) and 2.) motions directly corresponding to variable frequency excitation sources. Variable frequency excitation sources, e.g., periodic vibration associated with engine revolutions per minute (RPM) and/or wheel revolution rate, can be proportional to vehicle speed for wheeled vehicle navigation. Any asymmetry in vehicle alignment, wheel balance, air pressure, and/or passenger and cargo loading will manifest as a periodic signal, or harmonically related signature, with a fundamental frequency equal to the wheel revolution rate. As speed of the wheeled vehicle increases or decreases, the harmonically related signature will scale while the fixed mechanical resonances will remain approximately constant in frequency (approximate since the automobile mechanical modes have non-zero bandwidth, so will respond over a range of excitation frequencies).

Referring now to FIG. 8, process 800 can detect a periodic motion proportional to a distance traveled by a wheeled vehicle by receiving signals from inertial sensors of the wheeled vehicle at 810. At 820, process 800 can analyze periodic motion(s), or quasi-periodic features, of the wheeled vehicle based on the signals. In one aspect, process 800 can use a windowed short-time Fourier transform to identify and track the quasi-periodic features based in the signals received from the inertial sensors, e.g., using the history over many blocks to track moving components and identify stationary components. In another aspect, stationary components can be ignored by process 800.

At 830, process 800 can derive a signature of the periodic wheel rate of the wheeled vehicle based on the analyzed periodic motion(s). Further, process 800 can determine, at 840, a velocity of the vehicle based on the signature of the periodic wheel rate. In one aspect, process 800 can determine wheel diameter-like stride length in a pedometer, but any significant observation period with GPS and inertial sensor signals that are simultaneously available can allow process 800 to measure wheel diameter directly.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of mobile wireless devices. A processor can also be implemented as a combination of computing processing units.

In the subject specification, terms such as "store", "data store", "data storage", "database", "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

Figure 9:
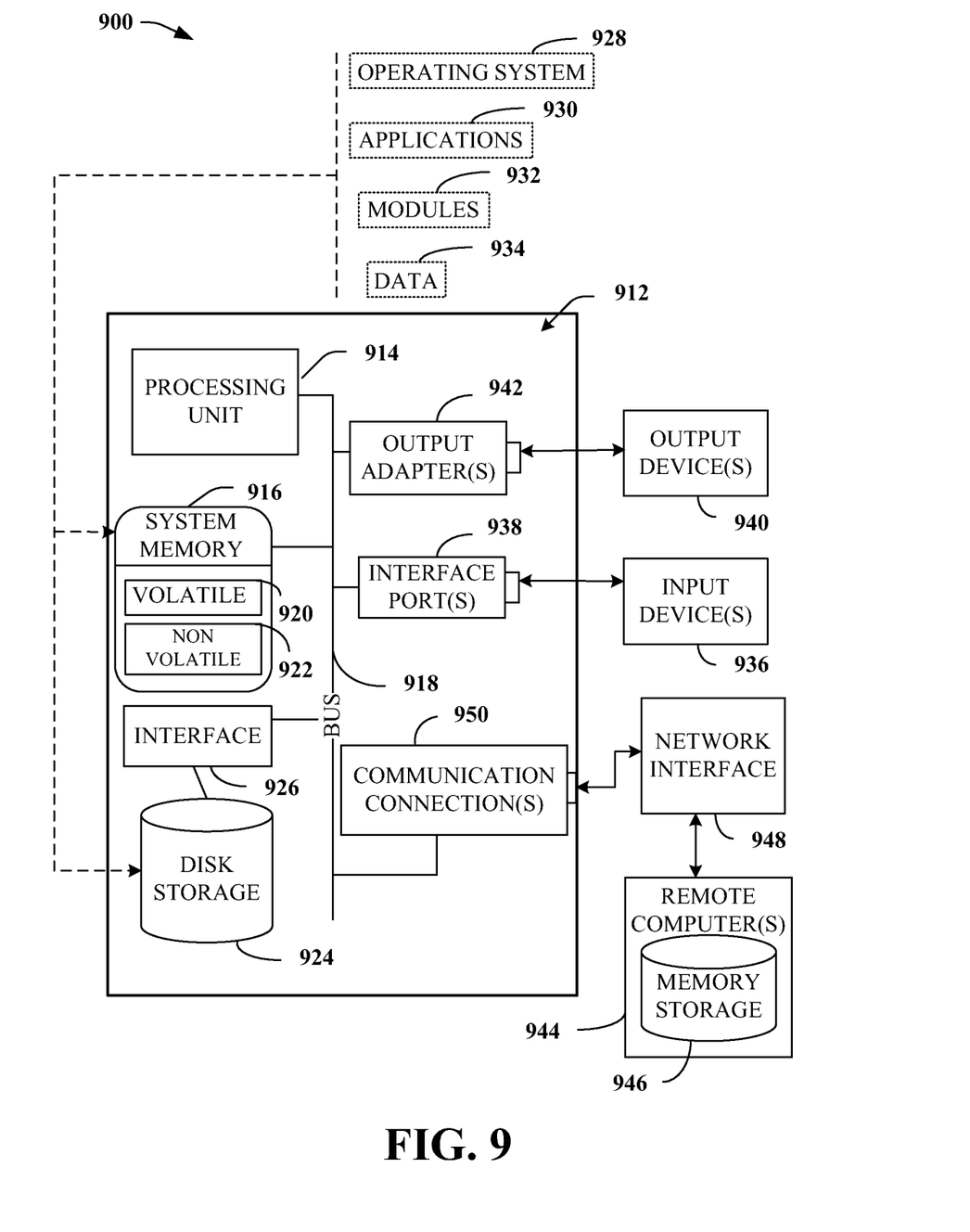
FIG. 9 illustrates a block diagram of a computer operable to execute the disclosed methods and apparatus, in accordance with an embodiment.

By way of illustration, and not limitation, nonvolatile memory, for example, which can be included in step profiles 210, non-volatile memory 922 (see below), disk storage 924 (see below), and memory storage 946 (see below) can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In order to provide a context for the various aspects of the disclosed subject matter, FIG. 9, and the following discussion, are intended to provide a brief, general description of a suitable environment in which the various aspects of the disclosed subject matter can be implemented, e.g., various systems and/or processes associated with FIGS. 1-8. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 9, a block diagram of a computing system 900 operable to execute the disclosed systems and methods is illustrated, in accordance with an embodiment. Computer 912 includes a processing unit 914, a system memory 916, and a system bus 918. System bus 918 couples system components including, but not limited to, system memory 916 to processing unit 914. Processing unit 914 can be any of various available processors. Dual microprocessors and other multiprocessor architectures also can be employed as processing unit 914.

System bus 918 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 916 includes volatile memory 920 and nonvolatile memory 922. A basic input/output system (BIOS), containing routines to transfer information between elements within computer 912, such as during start-up, can be stored in nonvolatile memory 922. By way of illustration, and not limitation, nonvolatile memory 922 can include ROM, PROM, EPROM, EEPROM, or flash memory. Volatile memory 920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 can also include removable/non-removable, volatile/non-volatile computer storage media, networked attached storage (NAS), e.g., SAN storage, etc. FIG. 9 illustrates, for example, disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to system bus 918, a removable or non-removable interface is typically used, such as interface 926.

It is to be appreciated that FIG. 9 describes software that acts as an intermediary between users and computer resources described in suitable operating environment 900. Such software includes an operating system 928. Operating system 928, which can be stored on disk storage 924, acts to control and allocate resources of computer 912. System applications 930 take advantage of the management of resources by operating system 928 through program modules 932 and program data 934 stored either in system memory 916 or on disk storage 924. It is to be appreciated that the disclosed subject matter can be implemented with various operating systems or combinations of operating systems.

A user can enter commands or information into computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 914 through system bus 918 via interface port(s) 938. Interface port(s) 938 include, for example, a serial port, a parallel port, a game port, and a universal serial bus (USB). Output device(s) 940 use some of the same type of ports as input device(s) 936.

Thus, for example, a USB port can be used to provide input to computer 912 and to output information from computer 912 to an output device 940. Output adapter 942 is provided to illustrate that there are some output devices 940 like monitors, speakers, and printers, among other output devices 940, which use special adapters. Output adapters 942 include, by way of illustration and not limitation, video and sound cards that provide means of connection between output device 940 and system bus 918. It should be noted that other devices and/or systems of devices provide both input and output capabilities such as remote computer(s) 944.

Computer 912 can operate in a networked environment using logical connections to one or more remote computers, such as remote computer(s) 944. Remote computer(s) 944 can be a personal computer, a server, a router, a network PC, a workstation, a microprocessor based appliance, a peer device, or other common network node and the like, and typically includes many or all of the elements described relative to computer 912.

For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refer(s) to hardware/software employed to connect network interface 948 to bus 918. While communication connection 950 is shown for illustrative clarity inside computer 912, it can also be external to computer 912. The hardware/software for connection to network interface 948 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used, or modifications and additions can be made to the described embodiments, for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

The aforementioned systems/circuits have been described with respect to interaction between several components. It can be appreciated that such systems/circuits and components can include those components or specified sub-components, some of the specified components or sub-components, and/or additional components, and according to various permutations and combinations of the foregoing. Sub-components can also be implemented as components communicatively coupled to other components rather than included within parent components, e.g., in a hierarchical fashion. Additionally, it should be noted that one or more components may be combined into a single component providing aggregate functionality or divided into several separate sub-components; and any one or more middle layers, such as a management layer, may be provided to communicatively couple to such sub-components in order to provide integrated functionality. Any components described herein may also interact with one or more other components not specifically described herein, but generally known by those of skill in the art.

What is claimed is:

1. A method, comprising:
    receiving signals from a sensor platform physically coupled to an object;
    generating world-frame coordinate information based on the signals;
    generating p-frame coordinate information based on the world-frame coordinate information;
    correlating the p-frame coordinate information with profiles of the object moving with the sensor platform to obtain correlated p-frame coordinate information; and
    estimating, by a system comprising a processor based on the correlated p-frame coordinate information, a direction of travel of the object irrespective of the orientation of the sensor platform relative to the object.

2. The method of claim 1, wherein the correlating comprises:
    correlating the p-frame coordinate information with step profiles of a pedestrian stepping with the sensor platform in a particular location.

3. The method of claim 2, further comprising:
    detecting false steps of the pedestrian in response to the correlating the p-frame coordinate information with the step profiles; and
    estimating a direction of travel of the pedestrian by rejecting the false steps.

4. The method of claim 2, further comprising:
    recording, over a period of time, one or more gait patterns of the pedestrian in a training database; and
    generating the step profiles based on the one or more gait patterns.

5. The method of claim 2, further comprising:
    utilizing a learning algorithm to generate the step profiles.

6. The method of claim 2, wherein the correlating the p-frame coordinate information with the step profiles comprises:
    filtering the p-frame information to obtain filtered p-frame information; and correlating the filtered p-frame information with the step profiles.

7. The method of claim 1, wherein the estimating comprises:
    estimating the direction of travel of the object using map information.

8. The method of claim 1, further comprising:
    reducing power consumption of the sensor platform in response to the estimating the direction of travel of the object.

9. The method of claim 1, further comprising:
    determining a wheel revolution rate of a vehicle based on the signals.

10. A system, comprising:
a sensor fusion component configured to:
- receive data from sensors of a sensor platform coupled to a pedestrian; and
- generate world coordinate information based on the data;

a gait recognition component configured to:
- record one or more walking patterns of the pedestrian in a training database; and
- determine whether the world coordinate information is associated with a walking pattern of the one or more walking patterns; and a position estimation component configured to:
- estimate a position of the pedestrian based on the world coordinate information in response to a determination that the world coordinate information is associated with the walking pattern, regardless of an orientation of the sensor platform with respect to the position of the pedestrian.

11. The system of claim 10, wherein the sensors comprise at least one of an inertial sensing device, a magnetic sensor, an altimeter, or a global positioning system (GPS) sensor.

12. The system of claim 10, wherein the sensor fusion component is further configured to generate, based on the data, an orientation, a linear acceleration, and an angular velocity of the sensor platform in a world coordinate system.

13. The system of claim 10, wherein the sensor fusion component combines information received from a 3-axis gyroscope and a 3-axis accelerometer to generate the world coordinate information in quaternion form.

14. The system of claim 10, wherein the position estimation component estimates, via Bayesian inference, the position of the pedestrian utilizing map information.

15. The system of claim 11, further comprising a GPS power management component configured to regulate a duty cycle of the GPS sensor based on a tracking state, a stationary state, and a learning state.

16. The system of claim 10, wherein the sensor fusion component, the gait recognition component, and the position estimation component are included in an integrated circuit.

17. The system of claim 10, wherein the sensor platform, the sensor fusion component, the gait recognition component, and the position estimation component are included in an integrated circuit.

18. The system of claim 17, wherein the integrated circuit is included in at least one of an earphone, an earring, a pen, or eye glasses.

19. The system of claim 10, wherein the position of the pedestrian is transmitted to a display device via a wireless protocol.

20. An apparatus, comprising:
- means for combining information received from different sensors of a sensor platform physically coupled to an entity;
- means for converting world-frame data of the combined information into p-frame data;
- means for correlating the p-frame data with profiles of the entity moving with the sensor platform; and
- means for estimating a direction of travel of the entity based on an output of the means for correlating the p-frame data with the profiles, irrespective of an orientation of the sensor platform with respect to the entity.

21. The apparatus of claim 20, wherein the means for correlating comprises:
- means for correlating the p-frame data with step profiles of a pedestrian stepping with the sensor platform.

22. The apparatus of claim 21, wherein the means for estimating comprises:
- means for estimating a direction of travel of the pedestrian based on an output of the means for correlating the p-frame data with the step profiles.

23. The apparatus of claim 20, further comprising:
- means for reducing power consumption of the sensor platform based on an output of the means for estimating the direction of travel of the entity.

24. The apparatus of claim 20, further comprising:
- means for determining a wheel revolution rate of a vehicle based an output of the means for combining the information.

25. The method of claim 2, further comprising:
- estimating the direction of travel of the pedestrian based on the correlated p-frame coordinate information.

* * * * *